(12) United States Patent  
Manral et al.

(10) Patent No.: US 9,813,322 B2
(45) Date of Patent: Nov. 7, 2017

(54) SENDING TRAFFIC POLICIES

(71) Applicant: HEWLETT-PACKARD DEVELOPMENT COMPANY, L.P., Houston, TX (US)

(72) Inventors: Vishwas Manral, Palo Alto, CA (US); James S. Hiscock, Rockport, MA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 5 days.

(21) Appl. No.: 14/763,757

(22) PCT Filed: Jan. 30, 2013

(86) PCT No.: PCT/US2013/023751
§ 371 (c)(1),
(2) Date: Jul. 27, 2015

(87) PCT Pub. No.: WO2014/120141
PCT Pub. Date: Aug. 7, 2014

(65) Prior Publication Data
US 2015/0365344 A1    Dec. 17, 2015

(51) Int. Cl.
*H04L 12/26* (2006.01)
*H04L 12/701* (2013.01)
*H04L 12/801* (2013.01)
*H04L 12/825* (2013.01)
*H04L 12/721* (2013.01)
*H04L 12/803* (2013.01)
*H04L 12/923* (2013.01)
*H04L 29/06* (2006.01)

(52) U.S. Cl.
CPC .............. *H04L 43/10* (2013.01); *H04L 45/00* (2013.01); *H04L 45/66* (2013.01); *H04L 47/122* (2013.01); *H04L 47/17* (2013.01); *H04L 47/266* (2013.01); *H04L 47/762* (2013.01); *H04L 65/1006* (2013.01)

(58) Field of Classification Search
CPC ... H04L 43/0829; H04L 43/087; H04L 43/50; H04L 45/00; H04L 65/1006; H04L 43/0858; H04L 43/10; H04L 45/12; H04L 65/1009; H04L 65/80; H04L 41/0677
See application file for complete search history.

(56) References Cited

U.S. PATENT DOCUMENTS

2001/0025310 A1* 9/2001 Krishnamurthy  G06Q 10/06395
                                                       709/223
2002/0136163 A1  9/2002 Kawakami et al.
2004/0218531 A1  11/2004 Cherian et al.
2009/0147685 A1  6/2009 Malhotra
(Continued)

OTHER PUBLICATIONS

"Understanding the Capabilities of the Emerging FCoE Protocol," White Paper, Brocade, Feb. 18, 2009. <http://www.hds.com/assets/pdf/white-paper-emerging-fcoe-protocol.pdf>.
(Continued)

*Primary Examiner* — Raj Jain
(74) *Attorney, Agent, or Firm* — Fabian VanCott

(57) ABSTRACT

Sending traffic policies includes identifying a location of an issue source with a first router in a network layer of an interconnected network and sending to a second router located along a route towards the issue source a traffic policy that addresses an issue caused with the issue source.

15 Claims, 5 Drawing Sheets

(56) References Cited

U.S. PATENT DOCUMENTS

| | | |
|---|---|---|
| 2011/0029676 A1 | 2/2011 | Detrick et al. |
| 2011/0090798 A1* | 4/2011 | Hanes .................... H04L 43/10 370/241 |
| 2011/0158100 A1 | 6/2011 | Ye |
| 2011/0268127 A1 | 11/2011 | Dhar et al. |
| 2012/0033553 A1 | 2/2012 | Strulo et al. |
| 2015/0365344 A1* | 12/2015 | Manral .................. H04L 47/17 370/237 |

OTHER PUBLICATIONS

Kamiya et al., "Advanced FCoE: Extension of Fibre Channel over Ethernet," Proceedings of the 2011 3rd Workshop on Data Center-Converged and Virtual Ethernet Switching, Aug. 26, 2011.

Lemasa et al., "Fibre Channel over Ethernet in the Data Center: An Introduction," Cisco Systems, Oct. 12, 2007. <http://www.cisco.com/en/US/solutions/collateral/ns340/ns517/ns224/ns783/white_paper_FCIAFCoE.pdf>.

* cited by examiner

SENDING TRAFFIC POLICIES

BACKGROUND

Ethernet is a protocol that can carry different kinds of traffic including Internet Protocol (IP), Fiber Channel (FC), and so forth. Fibre channel over ethernet (FCoE) protocol is a protocol that is suitable for networks using ethernet. FCoE operates directly above the ethernet in the network protocol stack in the data link layer. FCoE enhances the ethernet standards to support a priority-based flow control, congestion notification and Enhanced Transmission Selection (ETS) mechanisms to prevent frame loss and provide reliability above the reliability provided by pure Ethernet networks. FCoE handles issues that range from addressing switch congestion in individual networks to allocating bandwidth within individual networks. The main application of FCoE is in data center storage area networks (SANs). FCoE has particular application in data centers because FCoE allows fewer cables to be used.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

FCoE does not operate at the network layer of interconnected networks, and accordingly, this protocol will not cross data link layer boundaries of interconnected networks. Thus, FCoE's procedures are not routable across network boundaries within interconnected networks. Since the functions of FCoE are defined in terms of layer 2 (data link) networks, FCoE has a limited reach. Internet protocol provides some traffic management controls, but does not provide some significant FCoE functions, such as per-priority pause, explicit congestion notification to traffic source, bandwidth percentage allocation per priority, and router function discovery.

The principles described herein include a method for controlling traffic in network layers of an interconnected network. Such a method includes identifying a location of an issue source with a first router in a network layer of an interconnected network and sending with the first router to a second router in the network layer of the interconnected network located along a route between the first router and the issue source a traffic policy that addresses the issue caused with the issue source. This policy is in turn translated by the second router and sent to the source.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1:
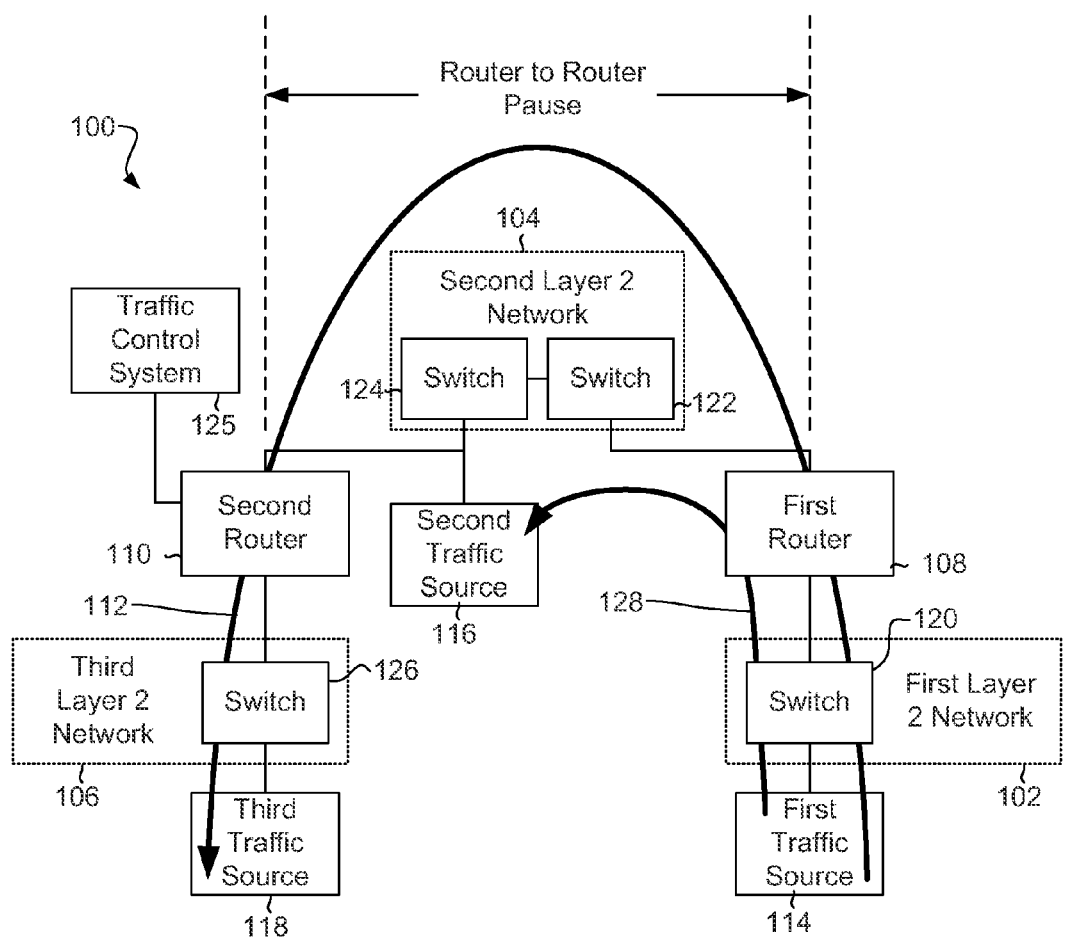
FIG. 1 is a diagram of an example of an interconnected network according to the principles described herein.

FIG. 1 is a diagram of an example of an interconnected network (100) according to the principles described herein. In this example, the interconnected network (100) connects a first layer 2 network (102), a second layer 2 network (104), and a third layer 2 network (106) with a first router (108) and a second router (110). Each of the layer 2 networks (102, 104, 106) contain at least one switch and other network devices. A first traffic source (114) sends traffic to the first layer 2 network (102), a second traffic source (116) sends traffic to the second layer 2 network (104), and a third traffic source (118) sends traffic to the third layer 2 network (106).

Each of the layer 2 networks (102, 104, 106) operates in the data link layer of the interconnected network (100) and have definite boundaries that cannot be crossed with data link layer protocols that are not routable through routers. The first and second routers (108, 110) operate in the network layer of the interconnected network (100) and can route Internet protocol signals to other routers in the interconnected network (100).

In this example, the first traffic source (114) can send signals to the third traffic source (118) along a route (112) of switch (120) in the first layer 2 network (102), to the first router (108), to switch (122) of the second layer 2 network (104), to switch (124) of the second layer 2 network (104), to the second router (110), to switch (126) of the third layer 2 network (106), and to the third traffic source (118). The first traffic source (114) can also send signals to the second traffic source (116) along a route (128) of switch (120) in the first layer 2 network (102), to the first router (108), to switch (122) of the second layer 2 network (104), to switch (124) of the second layer 2 network (104), and to the second traffic source (116).

According to the principles described herein, either the first or second routers (108, 110) identify locations of issue sources and address the issues caused by the issue sources with a traffic control system (125). The first or second router (108, 110) may be involved with the traffic issue, such as when either the first or the second router (108, 110) is experiencing traffic congestion. In other examples, the first or second router (108, 110) receives a message from a device behind either the first and/or second router (108, 110) that notifies the first or second router (108, 110) of a traffic issue, such as when either of the routers (108, 110) is experiencing traffic congestion. The issue sources may be any device in the interconnected network, including the first or second routers (108, 110), the traffic sources (114, 116, 118), the switches (120, 122, 124, 126), or other components of the interconnected network.

In response to identifying a traffic issue and its source, either the first or the second router (108, 110) determines a traffic policy to implement that addresses the identified issue. In the example of FIG. 1, the identified issue is that the second router (110) is congested. Thus, the second router (110) generates a pause command to send to at least one source of the second router's traffic. In some examples, the second router (110) sends a pause command to all of its traffic sources. In other examples, the second router (110) sends the pause command to a subset of its traffic sources.

In some examples, the components of the interconnected network (100) are mapped at each of the first and second routers (108, 110). The routers (108, 110) identify the traffic sources by matching the fiber channel header of the signals from the traffic sources with the equivalent out-going MAC address. In this manner, the traffic sources are identified. By knowing the source of the traffic to the congested network components, the first or second routers (108, 110) can identify the issue source. In the example of FIG. 1, the second router (110) identifies the first router (108) as an issue source. Thus, the second router (110) sends a traffic policy to the first router (108), which includes a pause command to pause at least some of the traffic from the first router (108) from going to the second router (110).

The second router (110) may use a function to determine which of its traffic sources to send the pause command. For example, the second router may send the pause command to the traffic source sending the most significant amount of traffic to the second router (110). In other examples, the second router sends the pause command to traffic sources that collectively exceed a percentage threshold of the second router's traffic, such as fifty percent of the second router's traffic. In other examples, any traffic source sending over a predetermined traffic threshold to the second router (110) will receive a pause command from the second router. While the example of FIG. 1 has been described with reference to specific functions for determining which of the traffic sources to which the second router (110) will send a pause command, any appropriate mechanism for selecting the recipients of the pause command may be used in accordance with the principles described herein.

In response to receiving the pause command, the first router's traffic sources discontinue sending signals to be routed through the second router (110). The second router's traffic sources may reroute their signals such that the traffic sources may continue to send the signals to their intended destinations, but along a different route. In other examples, the pause command instructs the traffic source for how long to wait until resuming to send the second router (110) the signals. Each of the selected traffic sources may resume sending traffic to the second router (110) at the same time or the resume time may be staggered for each traffic source. In other examples, the second router (110) sends the selected traffic sources a resume signal to indicate that the second router (110) is no longer congested and is available to receive traffic.

In the example of FIG. 1, the second router (110) selects the first router (108) as a traffic source to receive the pause command. Accordingly, the first router (108) discontinues to send traffic to the second router (110) while the pause command is effective. However, the pause command is applicable to just the traffic being sent to the second router (110). Thus, the first router (108) can still send traffic along route (128) to the second traffic source (116), even though the first router (108) discontinues sending traffic to the third traffic source (118) along route (112). As a result, traffic from the first router (108) intended for other destinations is not paused while the pause command is in effect. In this manner, just the traffic contributing to the second router's congestion is paused while the rest of the interconnected network's traffic is allowed to continue without interruption.

When a router generates a pause request, it can send a router-to-router pause request, which is used by the router to pause just packets sent to the requesting router's media access control address or send a layer 2 network pause command if the congestion was from that layer 2 network. In response to receiving a pause request message, the router acts upon its transmission on either the data link level of the interconnected network or network level of the interconnected network level. The routers can have two sets of transmit queues. A first set is destined for the local layer 2 network area and the second set is for to the next hop router. The second set allows router-to-router pausing without restricting traffic to local layer 2 network areas. As a consequence, such the second set removes one form of line blocking due to pause commands.

While this example has been described with reference to just two routers (108, 110), three layer 2 networks (102, 104, 106), four switches (120, 122, 124, 126), and three interconnected network traffic sources (114, 116, 118), any number of routers, layer 2 networks, switches, interconnected network traffic sources, or other network devices may be used in accordance with the principles described herein. For example, the interconnected network may include hundreds or thousands of routers, switches, traffic sources, and/or layer 2 networks. Further, any arrangement of routers, layer 2 networks, switches, interconnected network traffic sources, or other network devices may be used in accordance with the principles described herein.

Figure 2:
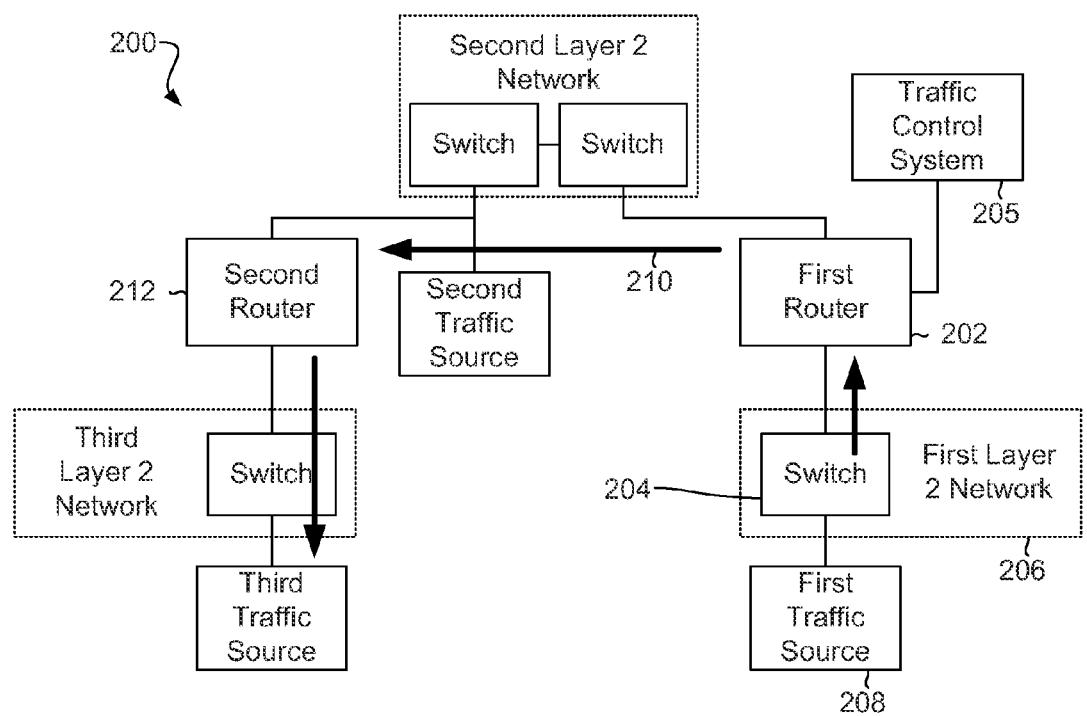
FIG. 2 is a diagram of an example of an interconnected network according to the principles described herein.

FIG. 2 is a diagram of an example of an interconnected network (200) according to the principles described herein. In this example, the first router (202) receives a message from a switch (204) of the first layer 2 network (206) that indicates that the switch (204) or another device in the first layer 2 network (206) is congested. In other examples, the message informs the first router (202) of another traffic issue. The first router (202) identifies and addresses the traffic issue with the traffic control system (205).

In response to receiving the message from the switch (204), the first router (202) identifies the source of the traffic issue. The first router (202) identifies traffic sources that are congesting the switch (204) or are at least contributing to the switch's congestion. The first router (204) may identify a source that was identified in the message that the first router (202) received from the switch (204). In other examples, the first router identifies traffic sources routed through itself to the switch to identify traffic sources at least contributing to the switch's congestion. While this example has been described with reference to specific mechanisms for identifying the switch's traffic sources, any appropriate mechanism for identifying the switch's traffic sources may be used in accordance with the principles described herein.

In this example, the first router (202) identifies that the third traffic source (208) is an issue source that is at least contributing to the switch's congestion. The first router (202) generates a congestion notification identifying the switch (204) as being congested. Accordingly, the first router (202) sends the notification to the third traffic source (208) along a route (210) that includes the second router (212). As a result, the principles described herein allow for a congestion notification to be sent across layer 2 network boundaries. Thus, the principles described herein provide a mechanism to transmit congestion information on an end-to-end basis per traffic flow.

In some examples, the notification includes recommendations for how the third traffic source (208) can respond. Such recommendations may include pausing the traffic flow to the switch (204) for a predetermined time period, routing the traffic flow along another route, allowing smaller amounts of traffic to be sent to the switch (204) over a predetermined time period, other recommendations, or combinations thereof. The congestion notification may be sent to multiple traffic sources, all of the switch's traffic sources, a subset of the switch's traffic sources, a single traffic source, or combinations thereof.

Figure 3:
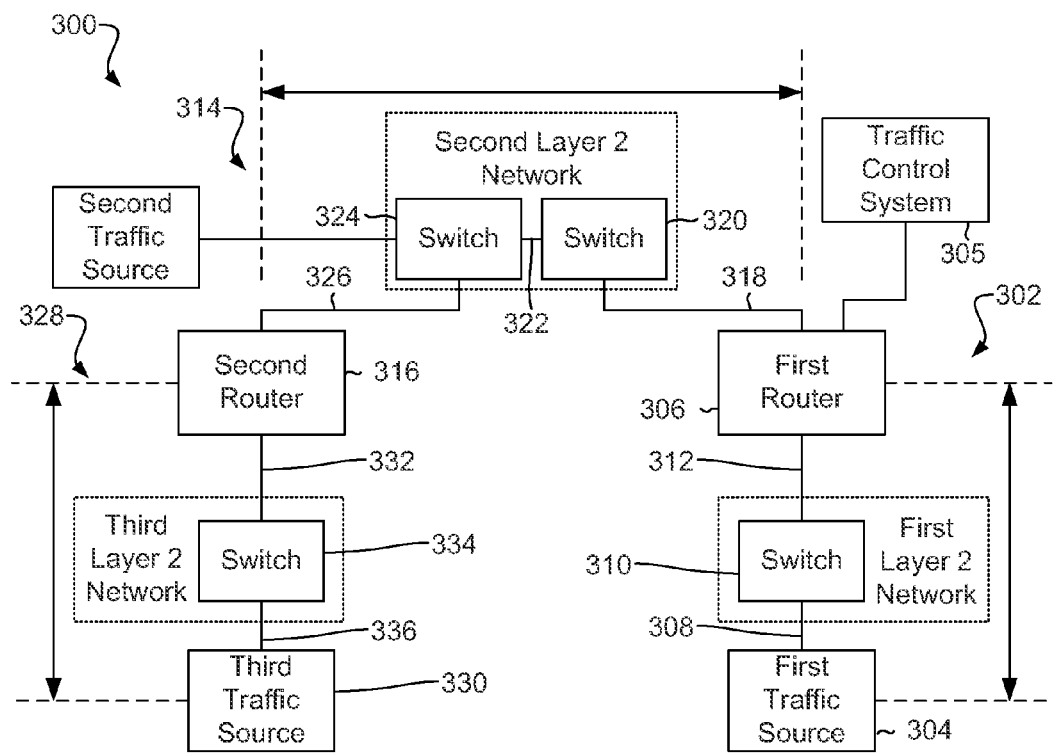
FIG. 3 is a diagram of an example of an interconnected network according to the principles described herein.

FIG. 3 is a diagram of an example of an interconnected network (300) according to the principles described herein. In this example, each link that connects traffic sources, routers, switches, and other network components together is coordinated. A coordinated link is a link that has a specific percentage of the total network bandwidth assigned to specific priorities.

A first layer 2 hop (302) exists between the first traffic source (304) and the first router (306). Within the first layer 2 hop (302), link (308) connects the first traffic source (304) to switch (310). Also, link (312) connects switch (310) to the first router (306). A second layer 2 hop (314) exists between the first router (306) and the second router (316). Within the second layer 2 hop (314), link (318) connects the first router (306) to switch (320). Link (322) connects switch (320) to switch (324), and link (326) connects switch (324) to the second router (316). A third layer 2 hop (328) exists between the second router (316) and the third traffic source (330). Within the third layer 2 hop (330), link (332) connects the second router (316) to switch (334). Also, link (336) connects switch (334) to the third traffic source (330).

A traffic issue may be caused, at least in part, to a non-optimal bandwidth allocation along an end to end route across the layer 2 network boundaries of the interconnected network (300). The first router (306), the second router (316), and any other routers in the interconnected network (300) coordinate with each other to assign a bandwidth allocation to each of the links to address the identified traffic issue. Traditionally, the bandwidth allocations are assigned within the layer 2 hops (312, 322, 334). However, the principles described herein allow the entire bandwidth allocation for the entire interconnected network (300) to be allocated to each link on an interconnected network basis rather than just a layer 2 hop basis. As a result, each link's bandwidth allocation is assigned in view of the interconnected network's parameters and the layer 2 hop's parameters. Consequentially, a more optimal bandwidth allocation across all of the links along the end to end route in the interconnected network (300) results across the layer 2 network boundaries.

In this example, the first and second routers (306, 316) overwrite link parameters to coordinate each of the layer 2 hop wide bandwidth settings with the traffic control system (305). The routers (306, 316) share all path wide data and compute end-to-end bandwidth coordination.

Figure 4:
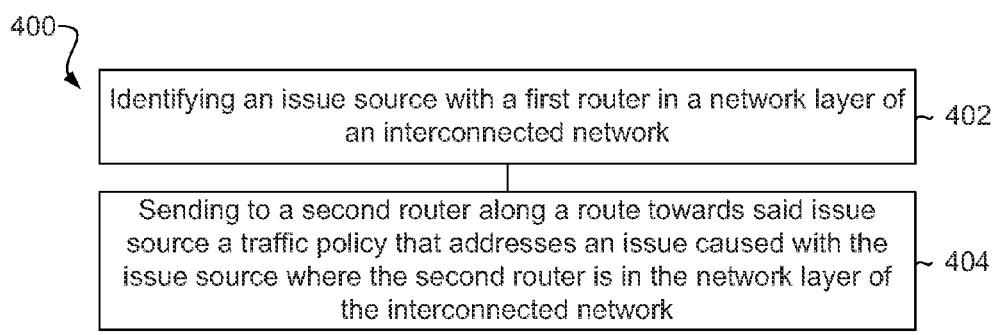
FIG. 4 is a diagram of an example of a method for sending traffic policies according to the principles described herein.

FIG. 4 is a diagram of an example of a method (400) of sending traffic policies according to the principles described herein. In this example, the method (400) includes identifying (402) an issue source with a first router in a network layer of an interconnected network and sending (404) to a second router located along a route towards the issue source a traffic policy that addresses an issue caused with the issue source where the second router is in the network layer of the interconnected network. This policy is in turn translated by the second router and sent to the source.

The traffic policy may include changing link bandwidth avocations along an end to end route in the interconnected network, sending a notification that a device behind the router is congested, sending a pause command instructing a second router to pause sending traffic to the first router, another traffic policy, or combinations thereof. In some examples, identifying the traffic issue with the router includes obtaining a message from a device behind the router that identifies the traffic issue in a data link layer of the interconnected network.

Figure 5:
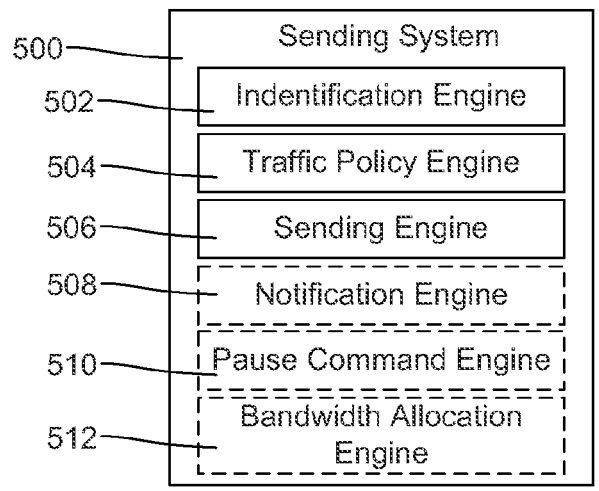
FIG. 5 is a diagram of an example of a sending system according to the principles described herein.

FIG. 5 is a diagram of an example of a sending system (500) according to the principles described herein. The controlling system (500) includes an identification engine (502), a traffic policy engine (504), and a sending engine (506). In some examples, the controlling system will additionally include a notification engine (508), a pause command engine (510), and a bandwidth allocation engine (512). The engines (502, 504, 506, 508, 510, 512) refer to a combination of hardware and program instructions to perform a designated function. Each of the engines (502, 504, 506, 508, 510, 512) may include a processor and memory. The program instructions are stored in the memory and cause the processor to execute the designated function of the engine.

The identification engine (502) identifies the existence of a traffic issue within the interconnected network. The identification engine (502) may identify the traffic issue in response to receiving a notice from another network device that identifies the issue. In other examples, the identification engine (502) actively retrieves status information from network components to identify the traffic issue.

The traffic policy engine (504) creates or selects a traffic policy to address the traffic issue. For example, the traffic policy engine (504) may customize a policy for each traffic issue identified with the identification engine (502). Such customization includes parameters that include which network components should be involved with the traffic policy, the duration of the traffic policy, the allocation of the responsibilities for implementing the traffic policy across those network components involved with the network policy, other parameters, or combinations thereof. In other examples, the traffic policy engine (504) selects a standardized traffic policy from a traffic policy library to implement in the interconnected network to address the traffic issue.

The sending engine (506) sends the traffic policy to the network components that are to be involved with the traffic policy. The notification engine (508) works with the traffic policy engine (504) to generate a notice of the issue. In some examples, the policy involves notifying other network components about the traffic issue without making specific requests from the notified network components. In this manner, the notified network components have an option to modify their behavior to minimize the traffic issue. In other examples, the notified network component is obligated to assist in the minimization of the traffic issue. The notification may be sent across the layer 2 network boundaries to routers or other network components within other layer 2 networks outside of the layer 2 network where the traffic issue exists.

The pause command engine (510) works with the traffic policy engine (504) to generate a pause command for at least one of the network components that is contributing to the traffic issue. The pause command may include instructions for selectively pausing traffic to just selected network components, the duration of the pause, other directions for how to end the pause, to pause all traffic to all network components, other parameters, of combinations thereof. The pause command may be effective for network components that fall outside of the layer 2 networks where the traffic issue exists. The pause command may be sent to routers, switches, traffic sources, other network components, or combinations thereof within or without the layer 2 network where the traffic issue exists.

The bandwidth avocation engine (512) works with the traffic policy engine (504) to adjust bandwidth allocations on a percentage basis of the entire bandwidth available on an interconnected network basis. In some examples, all of the links in the interconnected network are subject to modified bandwidth allocations. In other examples, just a subset of the links is subject to the modification. For example, the bandwidth allocations can apply to all of the links in just two out of four layer 2 networks within the interconnected network. The routers may analyze link bandwidth allocations across the layer 2 network boundaries to improve the bandwidth allocations across more than one layer 2 network.

Figure 6:
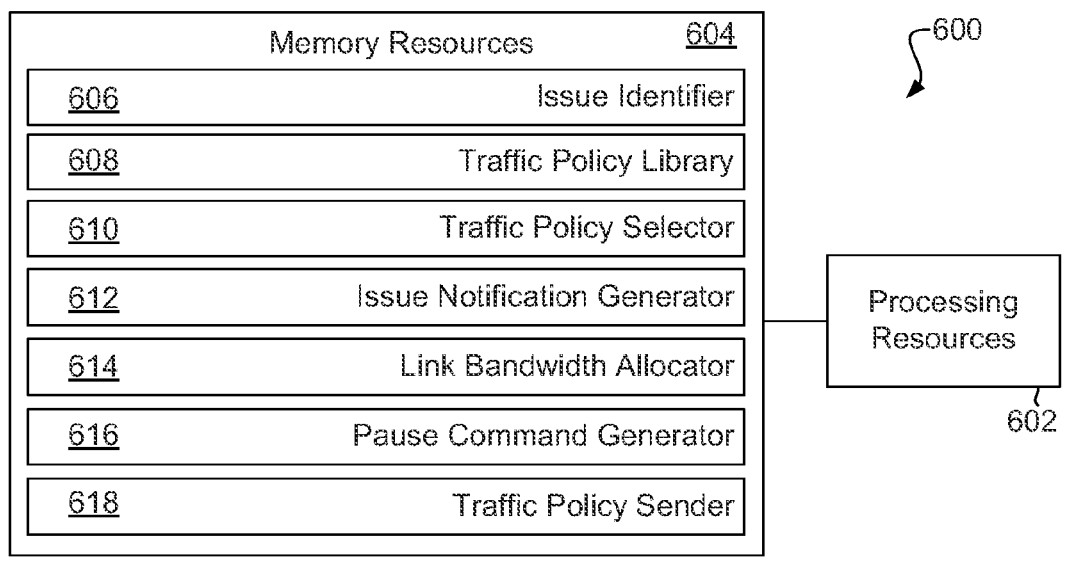
FIG. 6 is a diagram of an example of a sending system according to the principles described herein.

FIG. 6 is a diagram of an example of a sending system (600) according to the principles described herein. In this example, the controlling system (600) includes processing resources (602) that are in communication with memory resources (604). Processing resources (602) include at least one processor and other resources used to process programmed instructions. The memory resources (604) represent generally any memory capable of storing data such as programmed instructions or data structures used by the controlling system (600). The programmed instructions shown stored in the memory resources (604) include an issue identifier (606), traffic policy selector (610), an issue notification generator (612), a link bandwidth allocator (614), a pause command generator (616), and a traffic policy sender (618). The data structures shown stored in the memory resources (604) include a traffic policy library (608).

The memory resources (604) include a computer readable storage medium that contains computer readable program code to cause tasks to be executed by the processing resources (602). The computer readable storage medium may be tangible and/or non-transitory storage medium. The computer readable storage medium may be any appropriate storage medium that is not a transmission storage medium. A non-exhaustive list of computer readable storage medium types includes non-volatile memory, volatile memory, random access memory, memristor based memory, write only memory, flash memory, electrically erasable program read only memory, or types of memory, or combinations thereof.

The issue identifier (606) represents programmed instructions that, when executed, cause the processing resources (602) to identify traffic issues in an interconnect network. The traffic issue may exist within the data link layer of one of the layer 2 networks of the interconnected network, within the network layer of the interconnected network, or combinations thereof. The traffic policy selector (610) represents programmed instructions that, when executed, cause the processing resources (602) to select a traffic policy from the traffic policy library (608) that addresses the traffic issue.

The issue notification generator (612) represents programmed instructions that, when executed, cause the processing resources (602) to generate a notification to at least one network component about the traffic issue. The notification may be an obligatory notification where the recipient of the notification is obligated to take some kind of action to at least minimize the traffic issue. In other examples, the notification is non-obligatory, but the recipient of the notification has an option to reroute traffic or change other conditions to assist with minimizing the traffic issue.

The link bandwidth allocator (614) represents programmed instructions that, when executed, cause the processing resources (602) to allocate bandwidth in links that span at least one layer 2 network within the interconnected network. The link bandwidth allocator (614) may be activated if such a bandwidth allocation will at least help to minimize the traffic issue.

The pause command generator (616) represents programmed instructions that, when executed, cause the processing resources (602) to generate a pause command in a situation where pausing traffic across a layer 2 network boundary of the interconnected network will at least help minimize the effects of the traffic issue. The pause command may include parameters that identify which network devices should pause sending traffic, to whom the network devices should pause sending traffic, the duration of the pause, how to end the pause, when to end the pause, other parameters, or combinations thereof. The traffic policy sender (618) represents programmed instructions that, when executed, cause the processing resources (602) to send the traffic policy to at least another network device that is across the layer 2 network boundaries within the interconnected network.

Further, the memory resources (604) may be part of an installation package. In response to installing the installation package, the programmed instructions of the memory resources (604) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (602) and the memory resources (604) are located within the same physical component, such as a server, or a network component. The memory resources (604) may be part of the physical component's main memory, caches, registers, non-volatile memory, or elsewhere in the physical component's memory hierarchy. Alternatively, the memory resources (604) may be in communication with the processing resources (602) over a network. Further, the data structures, such as the libraries and may be accessed from a remote location over a network connection while the programmed instructions are located locally. Thus, the controlling system (600) may be implemented on a user device, on a server, on a collection of servers, or combinations thereof.

The controlling system (600) of FIG. 6 may be part of a general purpose computer. However, in alternative examples, the controlling system (600) is part of an application specific integrated circuit.

Figure 7:
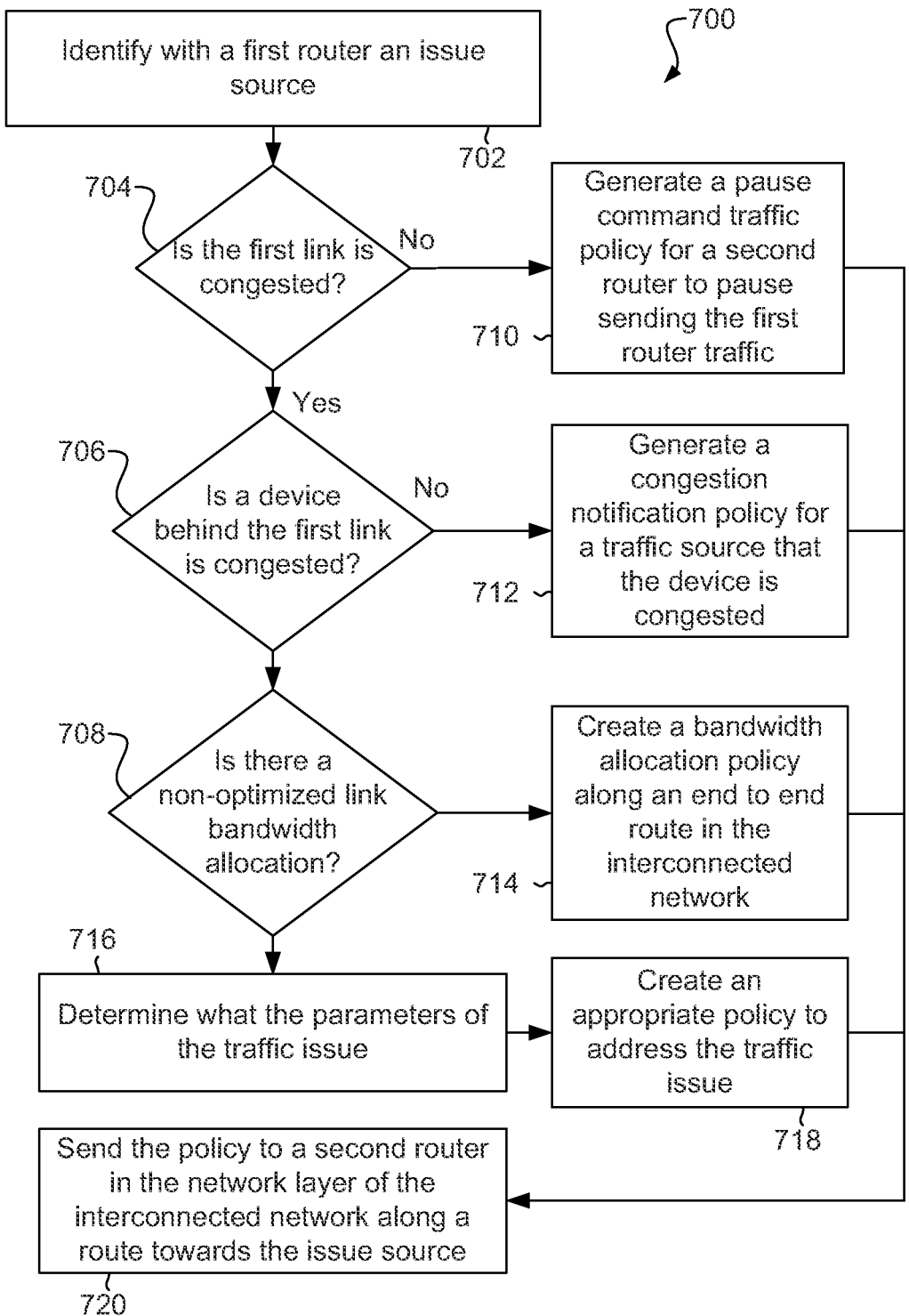
FIG. 7 is a diagram of an example of a flowchart of a process for sending traffic policies according to the principles described herein.

FIG. 7 is a diagram of an example of a flowchart (700) of a process for sending traffic policies according to the principles described herein. In this example, the process includes identifying (702) an issue source with a first router. The process also includes determining (704) whether the issue is a congested first link, determining (706) whether a device behind the first link is congested, and determining (708) whether there is a non-optimal link bandwidth allocation along an end to end route across the interconnected network.

If the first router is congested, the process includes generating (710) a pause command traffic policy for a second router to pause sending the first router traffic. If a device behind the first router is congested, the process includes generating (712) a congestion notification traffic policy for a traffic source indicating that the device is congested. If there is a non-optimal link bandwidth avocation, the process includes creating (714) a bandwidth avocation policy along an end to end route in the interconnected network.

If the traffic issue does not involve a congested router, a congested device behind the router, or a non-optimal bandwidth allocation, the process includes determining (716) the parameters of the issue and creating (718) an appropriate policy to address the issue. Regardless of type of policy generated, the process includes sending (720) the policy to a second router in the network layer of the interconnected network along a route towards the issue source. In some examples, the second router in the final destination of the policy. However, in other examples, the second router routes the policy to another network device and/or router further away from the layer 2 network where the issue exists.

While the examples above have been described with reference to specific traffic issues, any appropriate network issue may be used in accordance with the principles described herein. Further, while the examples above have been described with reference to specific mechanisms for addressing the traffic issues by reaching beyond the layer 2 network boundaries within the interconnected network, any appropriate mechanism for addressing the issues by reaching beyond the layer 2 network boundaries may be used in accordance with the principles described herein.

While the examples above have been described above with reference to specific interconnected network arrangements and interconnected network components, and interconnected network arrangements and components may be used in accordance with the principles described herein. While the examples above have been described with reference to specific pause policies, any appropriate pause policy may be used in accordance with the principles described herein. Further, while the examples above have been described with reference to specific issue notifications, any appropriate issue notifications may be used in accordance with the principles described herein. Also, while the examples above have been described with reference to specific bandwidth allocation policies, any appropriate bandwidth allocation policy that spans across layer 2 network boundaries may be used in accordance with the principles described herein.

The preceding description has been presented only to illustrate and describe examples of the principles described. This description is not intended to be exhaustive or to limit these principles to any precise form disclosed, Many modifications and variations are possible in light of the above teaching.

What is claimed is:

1. A method, comprising:
   receiving, at a first router in a network, a message from a device in the network, the message indicating that the device is having a traffic congestion issue;
   in response to receipt of the message, identifying, by the first router, a source of the first router's traffic; and
   sending, from the first router to a second router located along a route towards the source of the first router's traffic, a traffic policy that addresses the traffic congestion issue to cause the second router to solve the traffic congestion issue.

2. The method of claim 1, wherein said traffic policy is to cause the second router to change a link bandwidth allocation along an end to end route through said network.

3. The method of claim 1, wherein said traffic policy is to notify the second router that the device behind said first router is congested.

4. The method of claim 1, wherein said traffic policy is to cause said second router to pause sending at least some traffic from the source to said first router.

5. The method of claim 1, wherein identifying the source of the first router's traffic includes obtaining a message from the device behind said first router that identifies the source of the traffic in a data link layer of the network.

6. The method of claim 1, wherein the traffic policy is to instruct the second router to reduce sending the traffic from the source.

7. A first router, comprising:
   an identification engine to, in response to receiving a message from a device in a network indicating that the device is having a traffic congestion issue, identify a source of the first router's traffic;
   a traffic policy engine to identify a traffic policy to address the traffic congestion issue; and
   a sending engine to send said traffic policy to a second router that is along a route towards said source to cause the second router to solve the traffic congestion issue.

8. The first router of claim 7, further comprising a notification engine to generate a traffic notification intended for at least said second router.

9. The first router of claim 7, wherein the traffic policy is to cause the second router to pause sending at least some traffic from the source to the first router.

10. The first router of claim 7, wherein the traffic policy is to cause the second router to change link bandwidth allocations in an end to end route through the network.

11. A non-transitory computer readable storage medium having instructions stored thereon that, when executed by a processor, cause a first router to:
    receive a message from a device in a network indicating that the device is having a traffic congestion issue;
    in response to receipt of the message, identify a source of the first router's traffic;
    identify a traffic policy to address the traffic congestion issue; and
    send said traffic policy to a second router located along a route towards said source to cause the second router to solve the traffic congestion issue.

12. The computer readable medium of claim 11, wherein the traffic policy is to cause the second router to change link bandwidth allocations in an end to end route through said network.

13. The computer readable medium of claim 11, wherein the traffic policy is to notify the second router about said traffic congestion issue.

14. The computer readable medium of claim 11, wherein the traffic policy is to cause the second router to restrict the traffic from the source to said first router.

15. The computer readable medium of claim 11, wherein said traffic congestion issue is caused by a non-optimized link bandwidth allocation in said network.

* * * * *